United States Patent [19]
Derfiny

[11] Patent Number: 5,181,263
[45] Date of Patent: Jan. 19, 1993

[54] WAVE-GUIDE I/O FOR OPTICAL OR ELECTRO-OPTICAL COMPONENTS

[75] Inventor: Dennis Derfiny, Clarendon Hills, Ill.

[73] Assignee: Motorola, Inc., Schaumburg, Ill.

[21] Appl. No.: 711,606

[22] Filed: Jun. 7, 1991

Related U.S. Application Data

[63] Continuation of Ser. No. 526,207, May 21, 1990, abandoned.

[51] Int. Cl.[5] .............................................. G02B 6/28
[52] U.S. Cl. .................................... 385/24; 385/33; 385/49
[58] Field of Search ............... 350/96.15, 96.17, 96.18, 350/96.20; 385/24, 31, 33, 39, 44, 45, 48, 49

[56] References Cited

U.S. PATENT DOCUMENTS

| | | | |
|---|---|---|---|
| 4,611,884 | 9/1986 | Roberts | 350/96.15 |
| 4,732,446 | 3/1988 | Gipson et al. | 350/96.15 |
| 4,875,750 | 10/1989 | Spaeth et al. | 350/96.18 |
| 4,897,711 | 1/1990 | Blonder et al. | 350/96.17 X |
| 4,932,745 | 6/1990 | Blonder | 350/96.20 |
| 4,981,334 | 1/1991 | Sniadower | 350/96.15 |
| 4,989,934 | 2/1991 | Zavracky et al. | 350/96.18 X |
| 5,037,170 | 8/1991 | Uken et al. | 385/48 X |

Primary Examiner—John D. Lee
Assistant Examiner—S. W. Barns
Attorney, Agent, or Firm—Jon Christensen

[57] ABSTRACT

An apparatus simplifying the creation of right-angle optical paths between optical structures. The apparatus allows the input/output of optical signals from an optical wave-guide.

8 Claims, 2 Drawing Sheets

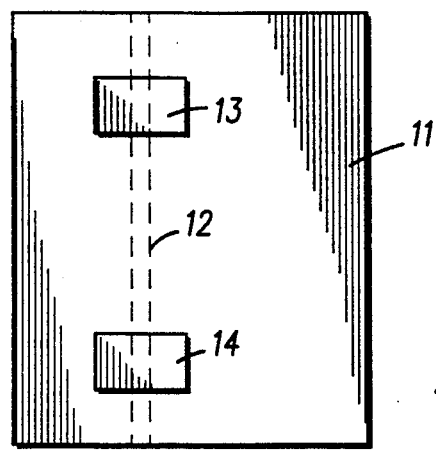
FIG.1
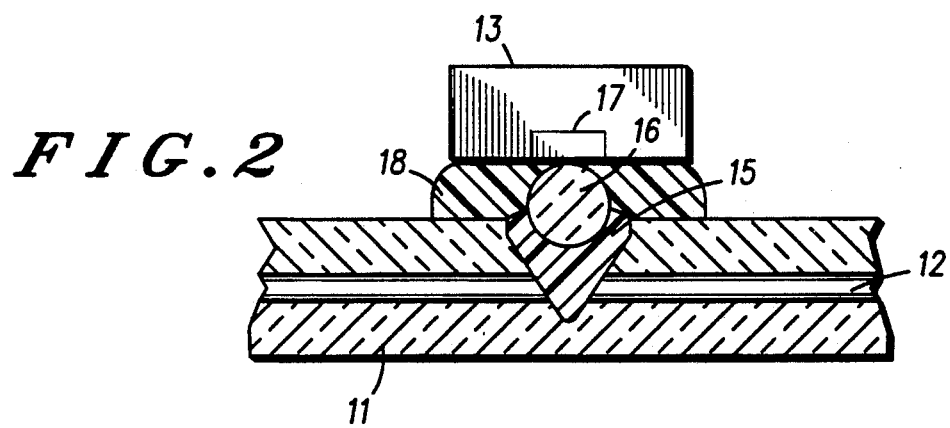
FIG.2
FIG.3
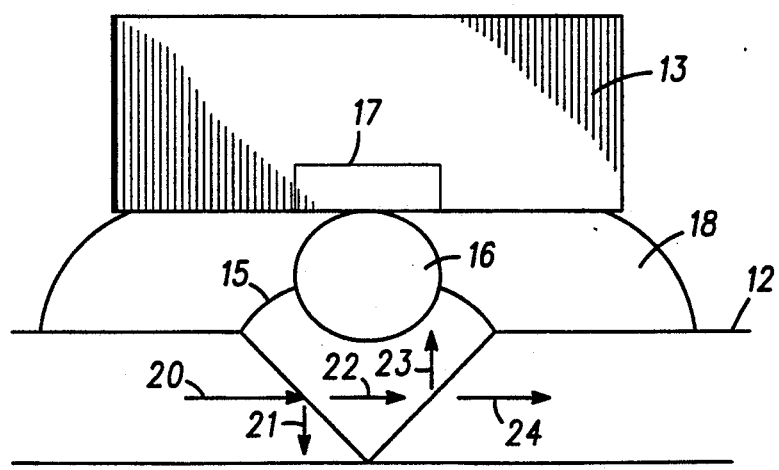

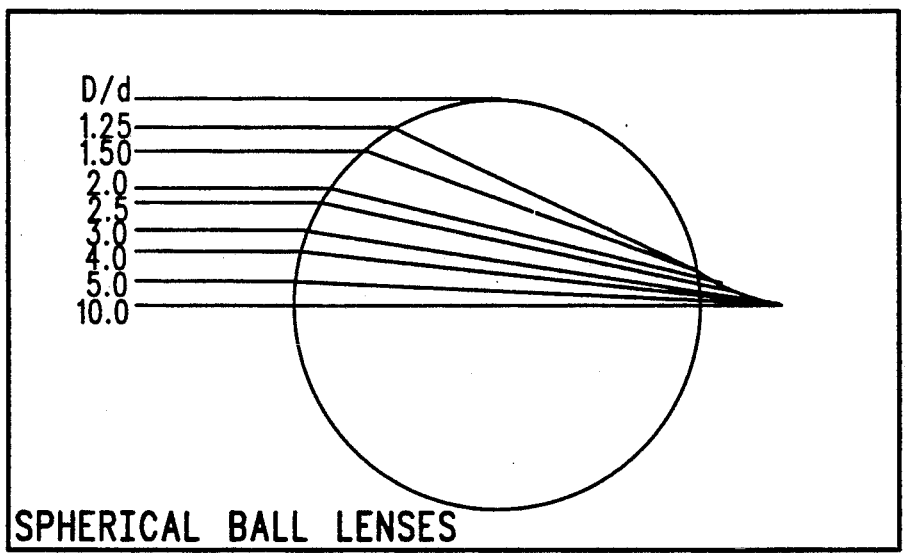

SPHERICAL BALL LENSES
- COLLIMATING LENSES
- FIBER COUPLING SPHERES

MATERIALS: OPTICAL GLASS BK-7
(DESIGNED REFRACTION RATIO: 1.516)

SPHERICITY: 1/2 WAVE   TOLERANCE: +5 μm

THE CALCULATION OF OPTICAL PATH WHEN COLLIMITED LIGHT COMES INTO SPHERICAL BALL LENS.

| | BACK FOCAL LENGTH(mm) | | | | |
|---|---|---|---|---|---|
| | BALL DIAMETER(mm) | | | | |
| D/d | 2mm | 4mm | 6mm | 8mm | 10mm |
| 1.25 | .358 | .716 | 1.074 | 1.432 | 1.79 |
| 1.50 | .534 | 1.068 | 1.602 | 2.136 | 2.67 |
| 2.00 | .716 | 1.432 | 2.148 | 2.864 | 3.58 |
| 2.50 | .786 | 1.572 | 2.358 | 3.144 | 3.93 |
| 3.00 | .832 | 1.664 | 2.496 | 3.328 | 4.16 |
| 4.00 | .876 | 1.752 | 2.628 | 3.504 | 4.38 |
| 5.00 | .882 | 1.764 | 2.648 | 3.528 | 4.41 |
| 10.00 | .926 | 1.852 | 2.778 | 3.704 | 4.63 |
| stock# | c32,744 | c32,745 | c32,746 | c32,747 | c32,748 |
| PRICE | $13.90 | $13.25 | $15.75 | $17.75 | $25.50 |

D/d: THE RATIO OF BALL LENS DIAMETER AND COLLIMATED INPUT BEAM DIAMETER.

COMPLETE SET OF BALL LENSES ABOVE   C32,749   $73.50

SOURCE: EDMUND SCIENTIFIC CATOLOG #19N7, PAGE9

*FIG. 4*

WAVE-GUIDE I/O FOR OPTICAL OR ELECTRO-OPTICAL COMPONENTS

This is a continuation of application Ser. No. 07/152,207, filed May 21, 1990 and now abandoned.

TECHNICAL FIELD

This invention relates to information transmission and more specifically to fiber-optics communication systems.

BACKGROUND

Fiber-optics communication systems are known. Such systems typical transmit optical signals along a wave-guide composed of an optical fiber between points of use. At the point of use the optical signal is typically converted through the use of an electro-optical converter into an electrical signal.

Optical signals/fiber optics systems, as are known, offer a number of advantages over conventional systems. Primary on the list of advantages is speed. On the one hand the speed that a fiber optics system can transmit information is limited by the speed of the optical signal in the optical fiber. On the other hand several optical signals of different wavelengths may be combined, and simultaneously transmitted within the same optical fiber with the signals later separated at the receiving end through the use of optical filters.

Secondary on the list of advantages, but also of great importance, is immunity to interference. Optical signals, as is known, are not susceptible to electromagnetic interference (EMI) nor does an optical signal generate EMI. Further, when optical signals are combined and transmitted simultaneously, mutual interference is not a limiting factor or even a consideration.

Fiber optics systems, as is also known, also offer a number of disadvantages. Primary on the list of disadvantages is in the difficulty of interfacing optical devices with other optical devices. The problem, as known, lies in the difficulty of transmitting an optical signal across the boundary within a connector from one device to another device. Wave-guides within connectors must be precisely aligned to avoid signal degradation. Presently available connectors avoiding the problems of signal degradation are bulky and time consuming in assembly. A better apparatus is needed to interface optical devices.

SUMMARY OF THE INVENTION

Pursuant to one embodiment of the invention an apparatus is disclosed for exchanging a communicated optical signal between an optical information bus and an electro-optical component. The optical information bus is created through use of an optical waveguide and optical interface. The interface is created to transmit a portion of an incident optical signal through the interface along the original axis of the wave-guide. The interface is also intended to divert a portion of the signal, at a substantially predetermined angle, between the axis of transmission of the wave-guide and the axis of transmission of the optical component.

The optical interface is created by first creating a V-shaped cut into the wave-guide with the predetermined angle on each side of the cut at substantially a forty-five degree angle to the axis of transmission of the wave-guide and then back-filling the cut with a polymer resin of substantially the same refractive index as the optics fiber.

A spherical ball lens is then disposed within the polymer resin above the interface to focus the optical signal into an active optical area of an optical or electro-optical component. The polymer resin maintains the spherical ball lens in position and provides a means for maintaining a predetermined spacial relation among the V-shaped cut, the spherical ball lens, and the electro-optical component.

In another embodiment of the invention the optical component is an optical transmitter. The component transmits a signal into the wave-guide through the optical interface.

BRIEF DESCRIPTION OF THE DRAWINGS

FIG. 1 comprises a drawing of a substrate containing two optical or electro-optical components and a wave-guide.

FIG. 2 comprises a simplified depiction of the interface between the optical component and the wave-guide.

FIG. 3 comprises a simplified depiction of reflected and refracted optical signals.

FIG. 4 comprises a chart of calculated optical paths within a spherical ball lens.

BEST MODE FOR CARRYING OUT THE INVENTION

Pursuant to one embodiment of the invention a substantially continuous optical information bus in the form of a waveguide and optical interfaces is created within a mounting board for optical or electro-optical devices. Optical devices are then mounted to the mounting board and interconnected with an optical fiber within the waveguide through the optical interfaces. Interconnection of the electro-optical devices with the optical fiber through the interfaces creates a substantially continuous optical information bus providing a communication channel for exchanging optical signals between a multitude of optical devices connected to the same waveguide.

Shown in FIG. 1 is an example of such an assembly generally (10). Shown is a mounting board (11) with an optical fiber embedded therein (12). Also shown is an electro-optical device (13) mounted on the board (11) communicating with a second optical device (14) over the optical fiber (12). An example of such a pair of optical devices is a CPU equipped to transmit and receive optical data communicating with a memory unit also equipped to transmit and receive optical data. It should be appreciated that the following description of operation of the invention may be applied to any number of electro-optical components interconnected with the same optical information bus.

Details of the interface of the optical device (13) to the optical fiber (12) are shown in FIG. 2. As shown the optical device (13) is attached to the mounting board (11) with a polymer resin (15). Also shown is a spherical ball lens (16) located directly in front of an optical sensing area (17) within the electro-optical device (13). As shown an optical signal passes along the optical fiber (12) until it reaches the area of the optical interface. In the area of the interface the optical fiber has been cut to create a flat surface on each side of the interface at substantially a forty-five degree angle with the axis of transmission of the wave-guide and the axis of transmission of the optical device. The area of the interface has been completely filled with the polymer resin.

In one embodiment of the invention the flat surfaces of the optical interface is created through the use of a drill. Where the diameter of the drill is large relative to the diameter of the optical fiber then the cut surface of the wave-guide approximates a flat surface. Where the tip of the drill is properly ground, a flat surface may be created on each side of the optical interface lying at forty-five degrees to the axis of transmission of the wave-guide.

When an optical signal passes through the optical fiber (12) and strikes the interface a portion of the signal passes through the cut, parallel to the original axis of transmission, and a portion of the signal is refracted upwards into the lensing structure (16) (providing a means for focusing the optical signal). The sphericity of the lensing structure (spherical ball lens) is selected to be in increments of substantially one-half wave length of the incident optical signal. Upon passing through the lensing structure (16) the optical signal is focused parallel with the axis of transmission of the optical component on the optical sensing area (17) (object of transmission).

Shown in FIG. 3 is a simplified drawing of the optical interface. As shown an optical signal (20) strikes the interface from the left. On striking the flat surface of the interface (cut at substantially forty-five degrees to the axis of transmission) a portion of the optical signal (21) is reflected downwards at substantially a ninety degree angle to the axis of transmission of the wave-guide. If the polymer resin (15) has the same refractive index as the wave-guide (12) then a portion of the signal (22) will also be transmitted through the boundary of the optical interface normal to the axis of transmission of the wave-guide.

When the optical signal (22) reaches the far side of the optical interface the process will be repeated. A portion of the signal (23) will be reflected upwards into the axis of transmission of the optical component. The remaining portion of the signal (24) will be transmitted through the interface normal to the axis of transmission of the wave-guide.

Shown in FIG. 4 is a chart of calculated optical path of a collimated light entering the spherical ball lens (16). As shown a light beam entering the ball lens (16) anyplace on the lower hemisphere will be transmitted through the ball lens and focused on the same point on the optical sensing area (17).

Substantially surrounding the ball lens (16) and the polymer resin (15) is an opaque material (18) with a refractive index lower than either the ball lens (16) or the polymer resin (16). The purpose of the opaque material (18) is to limit optical signal loss by reflecting stray optical signal back into the signal path through the ball lens (16) and polymer resin (16). The opaque material (18) also acts to prevent cross-talk between the target optical device (17) and other nearby optical devices (not shown).

In another embodiment of the invention the optical component (13) may be an optical transmitter. It is apparent from the nature of optical devices that two way transmission of optical signals is possible within the wave-guide (12). In this case the optical ball lens (16) would produce a collimated beam (optical signal) directed into the optical interface which optical signal would then be partially transmitted in both directions within the wave-guide (12).

What is claimed is:

1. An apparatus for exchanging a communicated optical signal between an optical information bus and an electro-optical component, such apparatus comprising:
    A) a flat surface, for diverting at a substantially predetermined angle at least a portion of an optical signal between an axis of transmission within a waveguide of the optical information bus and an axis of transmission of the optical component, disposed on the wave-guide at substantially a forty-five degree angle to the axis of transmission within the wave-guide and the axis of transmission of the component, with a polymer resin at least partially disposed between the flat surface and an object of transmission on the electro-optical component;
    B) means for focusing the optical signal with respect to the electro-optical component and the waveguide; and
    C) means for maintaining a predetermined spatial relationship of the means for focusing and the electro-optical component.

2. The apparatus as in claim 1 wherein the optical information bus further comprises a waveguide embedded within an electro-optical device mounting board.

3. An apparatus for exchanging a communicated optical signal between an optical information bus and an electro-optical component, such apparatus comprising:
    A) means for diverting, at a substantially predetermined angle, at least a portion of an optical signal between an axis of transmission within a waveguide of the optical information bus and an axis of transmission of the optical component;
    B) a spherical ball lens with a sphericity that is substantially one-half wave-length of the optical signal for focusing the optical signal with respect to the electro-optical component and the waveguide; and
    C) means for maintaining a predetermined spatial relationship of the means for focusing and the electro-optical component.

4. The apparatus of claim 3 wherein the means for maintaining the spatial relationship comprises a polymer resin.

5. The apparatus of claim 3 wherein signal loss is substantially reduced by substantially surrounding the means for focusing with respect to the component and the wave-guide and the means for diverting at a substantially predetermined angle with an opaque material of a substantially lower refractive index than the means for focusing and the means for diverting.

6. A method for exchanging a communicated optical signal between a substantially continuous optical information bus and an electro-optical component, such method comprising the steps of:
    A) disposing a flat surface on a wave-guide of the optical information bus at substantially a forty-five degree angle to the axis of transmission within the wave-guide and the axis of transmission of the component;
    B) diverting at substantially a right angle at least a portion of an optical signal between an axis of transmission within the waveguide to an axis of transmission of the component;
    B) focusing the optical signal between the component and the waveguide; and
    C) transceiving the optical signal within the electro-optical component.

7. A method for exchanging a communicated optical signal between a substantially continuous optical information bus and an electro-optical component, such method comprising the steps of:

A) diverting at substantially a right angle at least a portion of an optical signal between an axis of transmission within a waveguide of the optical information bus to an axis of transmission of the component;

B) focusing the optical signal between the component and the waveguide by disposing in the axis of transmission of the component, a spherical ball lens with a sphericity substantially one-half wave-length of the optical signal; and C) transceiving the optical signal within the electro-optical component.

8. The method of claim 7 wherein the step of focusing further includes the step of maintaining a spatial relationship among waveguide, spherical ball lens, and component by disposing a polymer resin therebetween.

* * * * *